(12) United States Patent (10) Patent No.: US 12,597,568 B2
Hsieh et al. (45) Date of Patent: Apr. 7, 2026

(54) MANUFACTURING METHOD OF LITHIUM-ION CAPACITOR

(71) Applicant: CPC CORPORATION, TAIWAN, Kaohsiung (TW)

(72) Inventors: Tzu-Hsien Hsieh, Kaohsiung (TW); Ting-Jui Chang, Kaohsiung (TW); Jarrn-Horng Lin, Kaohsiung (TW); Yang-Chuang Chang, Kaohsiung (TW)

(73) Assignee: CPC CORPORATION, TAIWAN, Kaohsiung (TW)

( * ) Notice: Subject to any disclaimer, the term of this patent is extended or adjusted under 35 U.S.C. 154(b) by 407 days.

(21) Appl. No.: 18/388,156

(22) Filed: Nov. 8, 2023

(65) Prior Publication Data

US 2025/0054710 A1 Feb. 13, 2025

(30) Foreign Application Priority Data

Aug. 8, 2023 (TW) ................................. 112129722

(51) Int. Cl.
| | |
|---|---|
| *H01G 11/86* | (2013.01) |
| *H01G 11/06* | (2013.01) |
| *H01G 11/38* | (2013.01) |
| *H01G 11/50* | (2013.01) |
| *H01G 11/84* | (2013.01) |

(52) U.S. Cl.
CPC ............. *H01G 11/86* (2013.01); *H01G 11/06* (2013.01); *H01G 11/84* (2013.01); *H01G 11/38* (2013.01); *H01G 11/50* (2013.01)

(58) Field of Classification Search
CPC ........ H01G 11/84; H01G 11/86; H01G 11/52; H01G 11/54–64; H01G 11/06; H01G 11/30–50
See application file for complete search history.

(56) References Cited

U.S. PATENT DOCUMENTS

| | | | | |
|---|---|---|---|---|
| 2013/0271085 | A1* | 10/2013 | Chen | H01M 4/1393 |
| | | | | 429/188 |
| 2013/0330611 | A1* | 12/2013 | Chen | H01M 4/608 |
| | | | | 977/734 |
| 2018/0233297 | A1* | 8/2018 | Zhamu | H01G 11/74 |
| 2018/0331387 | A1* | 11/2018 | Kovacs | H01G 11/62 |
| 2019/0108948 | A1* | 4/2019 | Chai | H01G 11/06 |
| 2022/0246898 | A1* | 8/2022 | Ho | H01M 4/0404 |

* cited by examiner

*Primary Examiner* — Scott B Geyer
(74) *Attorney, Agent, or Firm* — Maschoff Brennan

(57) ABSTRACT

Disclosed is a manufacturing method of a lithium-ion capacitor, comprising a positive electrode production step of mixing a lithium-rich material, activated carbon, a conductive additive and a aqueous adhesive to form a slurry by using water as a solvent, and then applying the slurry to a carbon-coated aluminum foil to form a positive electrode sheet; a negative electrode production step of mixing a negative electrode material, a conductive additive and a aqueous adhesive to form a slurry by using water as a solvent, and then applying the slurry to a copper foil to form a negative electrode sheet; and an assemble step of assembling the positive electrode sheet, the negative electrode sheet, an electrolyte and a separator into a capacitor without pre-lithiation.

8 Claims, No Drawings

MANUFACTURING METHOD OF LITHIUM-ION CAPACITOR

FIELD OF THE INVENTION

The present invention relates to a manufacturing method of a lithium-ion capacitor and more particularly relates to a manufacturing method of a lithium-ion capacitor by using water as a solvent.

BACKGROUND OF THE INVENTION

Lithium-ion capacitors are capacitors with high energy density and high safety. A positive electrode of the lithium-ion capacitor is made of activated carbon-based electrode which is material same as super capacitors, and a negative electrode of the lithium-ion capacitor is made of negative electrode material which is commonly used for general batteries, such as graphite, soft carbon, and hard carbon. Lithium-ion capacitors have the characteristics including fast charge and fast discharge of super capacitors and high energy density of lithium batteries.

When lithium-ion capacitors are fabricated by using traditional general battery negative electrode, a pre-lithiation process using metallic lithium is required. The pre-lithiation process requires the use of expensive equipment in a strictly controlled environment, and organic solvents are material inevitably used for processing the electrode sheets, which causes the manufacturing cost of lithium-ion capacitors to be high.

Therefore, the industry is seeking for a lithium-ion capacitor that can reduce material costs and production environment requirements to lower the production cost of lithium-ion capacitors.

SUMMARY OF THE INVENTION

Therefore, one objective of present invention is to provide a manufacturing method of a lithium-ion capacitor thereof to address the issue of high manufacturing cost of lithium-ion capacitors.

In order to overcome the technical problems in prior art, the present invention provides a manufacturing method of a lithium-ion capacitor, comprising: a positive electrode production step of mixing a lithium-rich material, activated carbon, a conductive additive and a aqueous adhesive to form a slurry by using water as a solvent, and then applying the slurry to a carbon-coated aluminum foil to form a positive electrode sheet; a negative electrode production step of mixing a negative electrode material, a conductive additive and a aqueous adhesive to form a slurry by using water as a solvent, and then applying the slurry to a copper foil to form a negative electrode sheet; and an assemble step of assembling the positive electrode sheet, the negative electrode sheet, an electrolyte and a separator into a capacitor without pre-lithiation.

In one embodiment of the present invention, a manufacturing method is provided, wherein the lithium-rich material is lithium manganate or lithium oxalate.

In one embodiment of the present invention, a manufacturing method is provided, wherein the activated carbon is activated carbon for supercapacitors, multi-porous carbon or high surface area carbon black.

In one embodiment of the present invention, a manufacturing method is provided, wherein the conductive additive is conductive carbon black or general carbon black.

In one embodiment of the present invention, a manufacturing method is provided, wherein the negative electrode material is graphite, soft carbon or hard carbon.

In one embodiment of the present invention, a manufacturing method is provided, wherein the electrolyte is electrolyte for lithium battery.

In one embodiment of the present invention, a manufacturing method is provided, wherein the separator is plastic fiber, cellulose fiber or glass fiber.

In one embodiment of the present invention, a manufacturing method is provided further comprising an activation step of activating the capacitor at a charging rate of 0.1 to 0.5 mV/s and a voltage of 2.2 to 3.8V.

By technical means of the present invention, the positive electrode material is mixed with lithium-rich materials such as lithium manganate (LMO) as the lithium source, water is used as the solvent to prepare the coating slurry, and water is also used as the solvent to prepare the coating slurry for the negative electrode, thereby eliminating the processing cost of the pre-lithiation process of reacting the negative electrode sheet with lithium metal and the subsequent process of assembling the negative electrode sheet and the positive electrode sheet to form a lithium-ion capacitor. The manufacturing method of the present invention can be applied to existing lithium battery production technology without the need to develop new equipment, thereby reducing the manufacture cost of lithium-ion capacitors.

DETAILED DESCRIPTION OF THE PREFERRED EMBODIMENTS

The preferred embodiments of the present invention are described in detail below. The description is used for explaining the embodiments of the present invention only, but not for limiting the scope of the claims.

According to the manufacturing method of a lithium-ion capacitor of the present invention, water is used as a solvent to make an electrode sheet, in which a high surface area carbon material of more than 1000 $m^2/g$ is mixed with a small amount of LMO material as the lithium source, the mixture above is mixed with a conductive additive, an aqueous adhesive and water to form a slurry, and then the slurry is applied to a carbon-coated aluminum foil to form a positive electrode sheet.

Next, negative electrode materials such as artificial graphite, soft carbon or hard carbon is mixed with a conductive adhesive, and the mixture above is mixed with an aqueous adhesive using water as the solvent to form a slurry, and then the slurry is applied to a copper foil to form a negative electrode sheet.

The method is then performed to assemble the positive electrode sheet and negative electrode sheet with separator and electrolyte into a lithium-ion capacitor, which is then activated and tested.

Example 1

In the manufacturing method according to an embodiment of the present invention, an activated carbon, a conductive carbon black and a lithium-rich material LMO are premixed in the ratio of 5:1:1 to obtain an active material, to which an aqueous adhesive with a solid content of 5 wt % equal to the active material is then added, and subsequently, water is added as a solvent, wherein the ratio of the activated carbon:the conductive carbon black:the LMO:the adhesive:the water is 5:1:1:7:14. Next, the obtained slurry is then ball milled by a ball mill at 300 rpm for 3 hours, coated onto a 16-micron meter-thick carbon-coated aluminum foil with a 200-micron scraper, and dried in an oven at 110° C. to obtain a positive electrode sheet.

Next, a soft carbon and a conductive carbon black are premixed in the ratio of 10:1 to obtain an active material, to which an aqueous adhesive with a solid content of 5 wt % equal to the active material is then added, and subsequently, water is added as solvent, wherein the ratio of the soft carbon:the conductive carbon black:the adhesive:the water is 10:1:11:32. Next, the obtained slurry is then ball milled by a ball mill at 300 rpm for 3 hours, coated onto a 8-micron meter-thick cupper foil with a 50-micron scraper, and dried in an oven at 110° C. to obtain a positive electrode sheet.

Next, 1M LiPF6/(EC/DEC) is used as the electrolyte, plastic membrane is used as the separator, and both positive and negative electrode fabricated as a coin cell.

Example 2

In the manufacturing method according to an embodiment of the present invention, an activated carbon, a conductive carbon black and a lithium-rich material LMO are premixed in the ratio of 5:1:1 to obtain an active material, to which an aqueous adhesive with a solid content of 5 wt % equal to the active material is then added, and subsequently, water is added as a solvent, wherein the ratio of the activated carbon:the conductive carbon black:the LMO:the adhesive: the water is 5:1:1:7:14. Next, the obtained slurry is then ball milled by a ball mill at 300 rpm for 3 hours, coated onto a 16-micron meter-thick carbon-coated aluminum foil with a 200-micron scraper, and dried in an oven at 110° C. to obtain a positive electrode sheet.

Next, a soft carbon and a conductive carbon black are premixed in the ratio of 10:1 to obtain an active material, to which an aqueous adhesive with a solid content of 5 wt % equal to the active material is then added, and subsequently, water is added as solvent, wherein the ratio of the soft carbon:the conductive carbon black:the adhesive:the water is 10:1:11:32. Next, the obtained slurry is then ball milled by a ball mill at 300 rpm for 3 hours, coated onto a 8-micron meter-thick cupper foil with a 50-micron scraper, and dried in an oven at 110° C. to obtain a positive electrode sheet.

Next, 1M LiPF6/(EC/DEC) is used as the electrolyte, cellulose membrane is used as the separator, and both positive and negative electrode fabricated as a coin cell.

Example 3

In the manufacturing method according to an embodiment of the present invention, an activated carbon, a conductive carbon black and a lithium-rich material LMO are premixed in the ratio of 5:1:1 to obtain an active material, to which an aqueous adhesive with a solid content of 5 wt % equal to the active material is then added, and subsequently, water is added as a solvent, wherein the ratio of the activated carbon:the conductive carbon black:the LMO:the adhesive: the water is 5:1:1:7:14. Next, the obtained slurry is then ball milled by a ball mill at 300 rpm for 3 hours, coated onto a 16-micron meter-thick carbon-coated aluminum foil with a 200-micron scraper, and dried in an oven at 110° C. to obtain a positive electrode sheet.

Next, a soft carbon and a conductive carbon black are premixed in the ratio of 10:1 to obtain an active material, to which an aqueous adhesive with a solid content of 5 wt % equal to the active material is then added, and subsequently, water is added as solvent, wherein the ratio of the soft carbon:the conductive carbon black:the adhesive:the water is 10:1:11:32. Next, the obtained slurry is then ball milled by a ball mill at 300 rpm for 3 hours, coated onto a 8-micron meter-thick cupper foil with a 50-micron scraper, and dried in an oven at 110° C. to obtain a positive electrode sheet.

Next, 1M LiPF6/(EC/DEC) is used as the electrolyte, glass membrane is used as the separator, and both positive and negative electrode fabricated as a coin cell.

Comparative Example 1

An activated carbon and a conductive carbon black are premixed in the ratio of 5:1 to obtain an active material, to which an aqueous adhesive with a solid content of 5 wt % equal to the active material is then added, and subsequently, water is added as a solvent, wherein the ratio of the activated carbon:the conductive carbon black:the adhesive:the water is 5:1:1:20. Next, the obtained slurry is then ball milled by a ball mill at 300 rpm for 3 hours, coated onto a 16-micron meter-thick carbon-coated aluminum foil with a 200-micron scraper, and dried in an oven at 110° C. to obtain a positive electrode sheet.

Next, a soft carbon and a conductive carbon black are premixed in the ratio of 10:1 to obtain an active material, to which an aqueous adhesive with a solid content of 5 wt % equal to the active material is then added, and subsequently, water is added as solvent, wherein the ratio of the soft carbon:the conductive carbon black:the adhesive:the water is 10:1:11:32. Next, the obtained slurry is then ball milled by a ball mill at 300 rpm for 3 hours, coated onto a 8-micron meter-thick cupper foil with a 50-micron scraper, and dried in an oven at 110° C. to obtain a positive electrode sheet.

Next, 1M LiPF6/(EC/DEC) is used as the electrolyte, plastic membrane is used as the separator, and both positive and negative electrode fabricated as a coin cell.

The coin cell capacitors of the Examples 1 to 3 and the Comparative Example 1 are activated for 5 cycles at 2.2-3.8V and current density of 0.01 A/g, and then subjected to a specific capacitance measurement at an operating voltage range of 2.2-3.8V, an energy density measurement, and another energy density measurement after 50,000 cycles at a current density of 0.5 A/g, and the results are shown in Table 1, wherein Comparative Example 1 shows only the energy density after 1000 cycles due to the significant energy density loss after cycling.

TABLE 1

|  | specific capacitance (F/g) | energy density (Wh/kg) | energy density after cycling (Wh/kg) |
|---|---|---|---|
| Example 1 | 166.84 | 58.40 | 39.16 |
| Example 2 | 170.06 | 59.74 | 44.69 |
| Example 3 | 175.32 | 62.18 | 31.74 |
| Comparative Example 1 | 135.27 | 46.55 | 3.23 |

As can be seen from Table 1, the capacitor of Comparative Example 1 without the use of lithium-rich materials has specific capacitance of 135.27 F/g and energy density of 46.55 Wh/kg at the operating voltage range of 2.2-3.8V, whereas it has a value of only 3.23 Wh/kg after 1000 cycles at current density of 0.5 A/g.

In contrast, the capacitor of Example 1 has a specific capacitance of 166.84 F/g and an energy density of 58.40 Wh/kg at the operating voltage range of 2.2-3.8V, and has a value of 39.16 Wh/kg after 50,000 cycles at 0.5 A/g current density.

The capacitor of Example 2 has a specific capacitance of 170.06 F/g and an energy density of 59.74 Wh/kg at the operating voltage range of 2.2-3.8V, and has a value of 44.69 Wh/kg after 50,000 cycles at 0.5 A/g current density.

The capacitor of Example 3 has a specific capacitance of 175.35 F/g and an energy density of 62.18 Wh/kg at the operating voltage range of 2.2-3.8V, and has a value of 31.74 Wh/kg after 50,000 cycles at 0.5 A/g current density.

It can be seen that the capacitors of Examples 1 to 3 have high capacitance values, and have low energy density loss rates, i.e., longer lifecycle, after multiple cycles of discharge.

By technical means of the present invention, the positive electrode material is mixed with lithium-rich materials such as lithium manganate (LMO) as the lithium source, water is used as the solvent to prepare the coating slurry, and water is also used as the solvent to prepare the coating slurry for the negative electrode, thereby eliminating the processing cost of the pre-lithiation process of reacting the negative electrode sheet with lithium metal and the subsequent process of assembling the negative electrode sheet and the positive electrode sheet to form a lithium-ion capacitor. The manufacturing method of the present invention can be applied to existing lithium battery production technology without the need to develop new equipment, thereby reducing the manufacture cost of lithium-ion capacitors.

The above description should be considered as only the discussion of the preferred embodiments of the present invention. However, a person having ordinary skill in the art may make various modifications without deviating from the present invention. Those modifications still fall within the scope of the present invention.

What is claimed is:

1. A manufacturing method of a lithium-ion capacitor, comprising:

a positive electrode production step of mixing a lithium-rich material, activated carbon, a conductive additive and a aqueous adhesive to form a slurry by using water as a solvent, and then applying the slurry to a carbon-coated aluminum foil to form a positive electrode sheet;

a negative electrode production step of mixing a negative electrode material, a conductive additive and a aqueous adhesive to form a slurry by using water as a solvent, and then applying the slurry to a copper foil to form a negative electrode sheet; and an assemble step of assembling the positive electrode sheet, the negative electrode sheet, an electrolyte and a separator into a capacitor without pre-lithiation.

2. The manufacturing method as claimed in claim 1, wherein the lithium-rich material is lithium manganate or lithium oxalate.

3. The manufacturing method as claimed in claim 1, wherein the activated carbon is activated carbon for super capacitors, multi-porous carbon or high surface area carbon black.

4. The manufacturing method as claimed in claim 1, wherein the conductive additive is conductive carbon black or general carbon black.

5. The manufacturing method as claimed in claim 1, wherein the negative electrode material is graphite, soft carbon or hard carbon.

6. The manufacturing method as claimed in claim 1, wherein the electrolyte is electrolyte for lithium battery.

7. The manufacturing method as claimed in claim 1, wherein the separator is plastic fiber, cellulose fiber or glass fiber.

8. The manufacturing method as claimed in claim 1, further comprising an activation step of activating the capacitor at a charging rate of 0.1 to 0.5 mV/s and a voltage of 2.2 to 3.8V.

* * * * *